Figure 4:
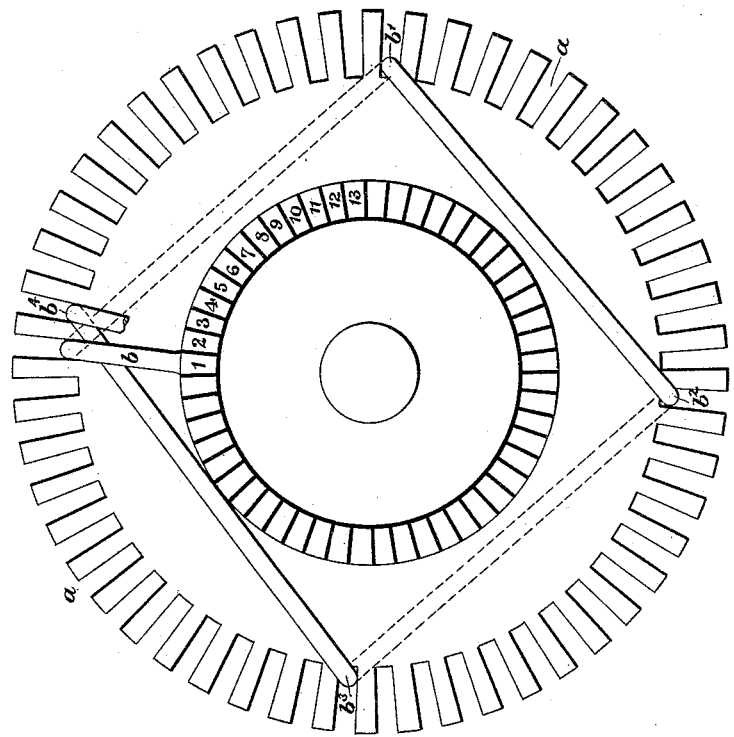

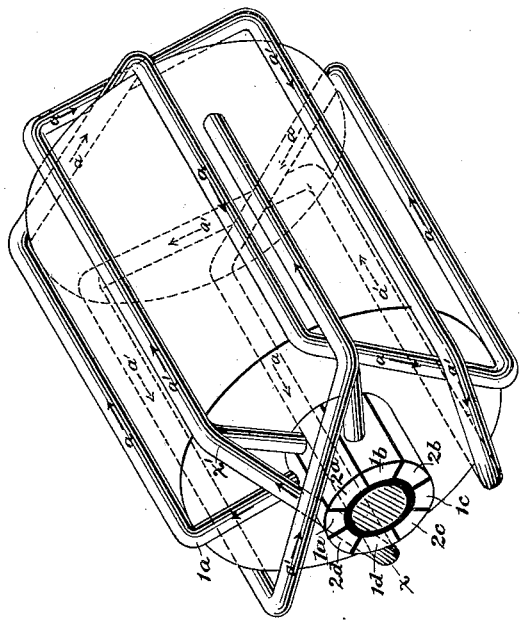

(No Model.)  S. C. C. CURRIE.  3 Sheets—Sheet 2.
DYNAMO ARMATURE.

No. 406,429.  Patented July 9, 1889.

Witnesses
Geo. W. Breck.
Edward Thorpe.

Inventor
S. C. C. Currie
By his Attorneys
Baldwin Davidson & Wight (No Model.)  
S. C. C. CURRIE.  
DYNAMO ARMATURE.

3 Sheets—Sheet 3.

No. 406,429.  Patented July 9, 1889.

Witnesses  
Geo. W. Breck  
Carrie E. Ashley

Inventor  
Stanley C. C. Currie  
By his Attorneys  
Baldwin Davidson & Wright

UNITED STATES PATENT OFFICE.

STANLEY C. C. CURRIE, OF PHILADELPHIA, PENNSYLVANIA, ASSIGNOR TO THE UNITED ELECTRIC IMPROVEMENT COMPANY, OF GLOUCESTER, NEW JERSEY.

DYNAMO-ARMATURE.

SPECIFICATION forming part of Letters Patent No. 406,429, dated July 9, 1889.

Application filed November 19, 1888. Serial No. 291,186. (No model.)

*To all whom it may concern:*

Be it known that I, STANLEY C. C. CURRIE, a subject of the Queen of Great Britain, but now a resident of Philadelphia, Pennsylvania, have invented a certain new and useful Improvement in Dynamo-Electric Machines, of which the following is a specification.

My invention consists in a new way of winding the armatures of dynamo-electric machines and of governing such machines, whether they be generators or motors, by throwing one or more commutator-brushes or brush-circuits into or out of action.

With the ordinary winding—such as that of the Gramme ring and its well-known modifications—in the event of a brush being removed from the commutator or its circuit being opened the corresponding armature winding or coil would have no current, or a reduced current, such reduced current being less than the current in the remaining closed circuit or circuits of the armature, in either of which cases there will be an uneven magnetic influence in or on the armature. With my improved winding the removal of a brush takes off or reduces current from a portion of the winding of the armature in such manner that each pole is equally and evenly influenced. I wind the armature as follows: Starting from one commutator-bar, the wire is wound upon the armature, making as many loops thereon as there are poles, and is finally connected with the wire leading from the next commutator-bar, which latter wire is similarly wound upon the armature—that is to say, in my system, starting from a commutator-bar, there is a complete winding or series of loops equal to the number of poles of the armature over the entire armature without intermediate connection to commutator-bars, as has heretofore been the custom. The winding is such that in the event of one or more of the brushes being lifted from the commutator such brushes as remain in contact (of course there will never be less than two) will cause a portion of wire in the armature to be active—that is to say, either giving out current, in the case of a generator, or receiving it, in the case of a motor—and in all cases the current is evenly distributed over the surface of the armature in such manner that each pole is equally influenced. The windings between the commutator-bars may be side by side, or arranged one on top of another, or some side by side and others on top, as will be apparent from the following description.

Figure 3:
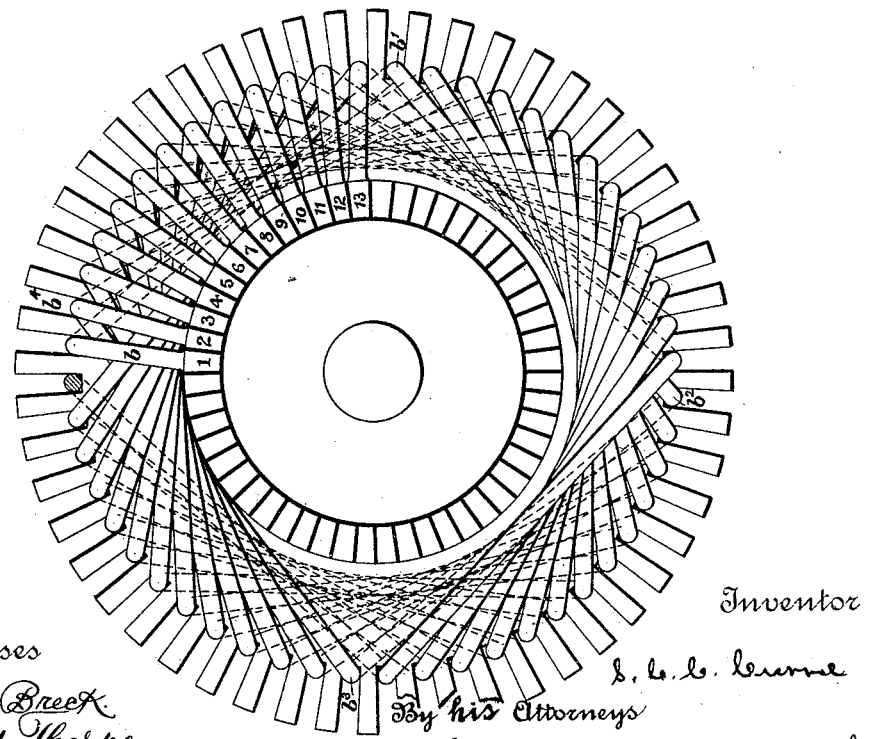
Figure 5:
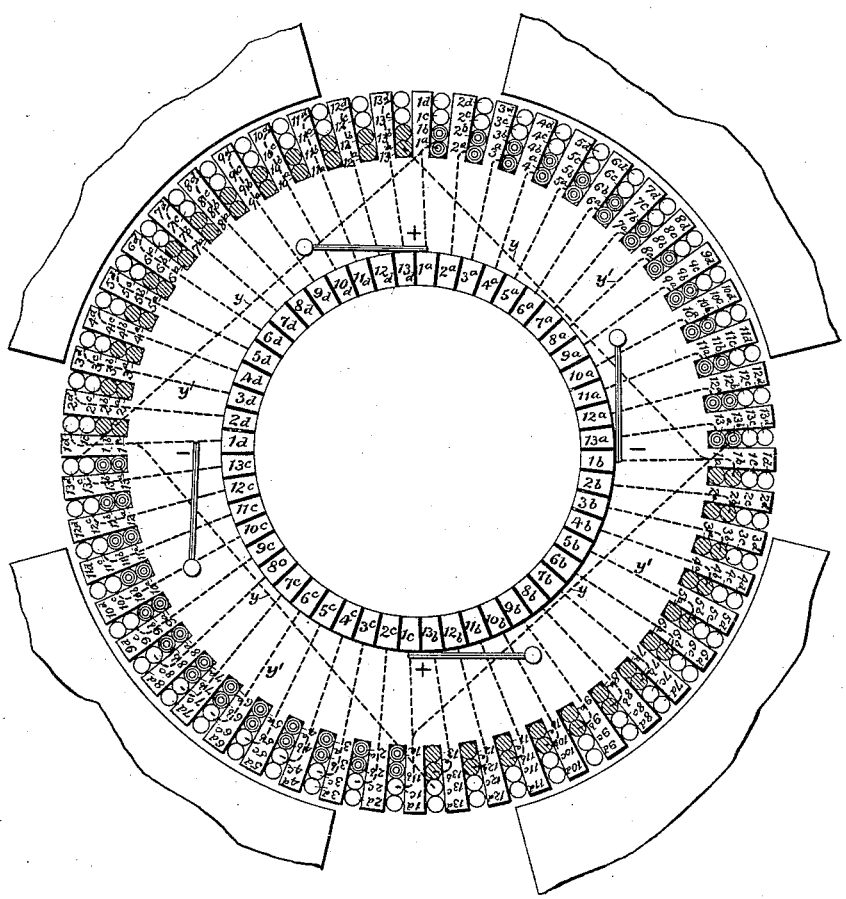

In the accompanying drawings, Figure 1 is a diagrammatic perspective view of one manner of winding a four-pole armature; Fig. 2, an end view of a four-pole armature, in diagram, showing the winding more fully; Figs. 3, 4, and 5, end diagram views of four-pole armatures, showing another manner of winding according to my invention.

Fig. 1 illustrates the invention in its simplest form. For the sake of illustration, only eight sections on the commutator are shown, and only one thickness of wire is to be on the surface of the armature—that is, the windings are side by side. The armature has four poles. Starting from commutator-bar $1^a$ the wire is wound on the drum in a zigzag form, first back to the rear end of the armature, across the rear end, then forward, across the front end, again back, and so on. After crossing four times (the armature shown being a four-pole armature) the end finishing at $x$ is connected to the second commutator-bar $2^a$ at $x'$, and the wire is again wound as before and connected with the third commutator-bar $1^b$, and so on until the whole drum is covered. The course of the wire starting at $1^a$ is indicated by the arrows and the letter $a$, and the course of the wire starting from the second bar $2^a$ is indicated by the arrows and the letter $a'$. It will therefore be obvious that the circuit between any two brushes is evenly distributed over the entire armature.

In Fig. 2 all the connections for a four-pole armature and a commutator of eight bars have been shown. Three brushes are illustrated—one being positive and the other two negative, as marked. The view, which is a mere diagram, is looking at the end of the armature. The four poles of the field are indicated. $1^a$ $2^a$ $1^b$ $2^b$ $1^c$ $2^c$ $1^d$ $2^d$ represent the commutator-bars and their corresponding wires, and the commutator is divided into quadrants A B C D. The wires are shown by the circles around the armature-periphery, lettered to correspond with the commutator-bars. The dotted lines joining circles and running below them represent the crossing of the wires at the back end of the armature, and those solid lines above or outside of circles represent the crossing of the wires at the front end of the armature. It may be assumed that the armature is that of a motor, that current is entering by the positive brushes and leaving by the negative brush. Those circles shaded with circular lines indicate the wire in which the current is supposed to be coming toward the observer, and those shaded by cross-section lines indicate the wires in which the current is flowing away from the observer. Those unshaded have no current passing in them. The commutator is divided into quadrants, each having two commutator-bars. As an illustration, and clearly descriptive of all, the wire starting from the commutator-bar $1^a$ will be traced. It passes from the commutator $1^a$ to the circumference of the armature, being there indicated by the unshaded circle $1^a$, then along the armature to its rear end, then across its rear end, as indicated by the dotted line $a'$, then to the front of the armature at $1^a$, then across the front end of the machine, as indicated by the solid curved line $a^2$, then to the rear of the armature, again across its rear end by the dotted line $a^3$, then to the front to $1^a$, and finally by the straight line $x$ to the wire $2^a$, connected with the second commutator-bar $2^a$. In like manner the winding between any other two commutator-bars may be traced. Obviously all of the poles are equally affected by the current passing in any one winding between any two commutator-bars. By throwing one of the positive brushes out of action—that is, out of contact with the commutator-ring—opening its circuit or introducing resistance into its circuit, there will of course be proportionately less current delivered to the armature in case of a motor, or taken from it in case of a dynamo, and this diminution of current will be felt at each pole of the armature equally. I am therefore enabled to effectively regulate the capacity of either a motor or generator by throwing one or more of its brushes into or out of action.

In Figs. 3, 4, and 5 I have shown a larger number of commutator-bars, and the wires forming the windings of the quadrants are to be superposed one upon another. Referring to Fig. 4, the wire $b$ of the commutator-bar 1 is carried to rear end of armature, across the end to $b'$, then forward, then across the front end to $b^2$, then back and across the end to $b^3$, and then forward to $b^4$, where it joins wire running from second commutator-bar 2. When all the wires of the first quadrant of the commutator, whose bars are numbered from 1 to 13, inclusive, have been similarly wound, there will be one complete layer over the entire circumference of the armature, as shown in Fig. 3; and when the wires of the remaining quadrants are wound there will be four layers upon the armature. In Fig. 5 I have indicated the four layers of the winding—that is, the wires forming the windings between the commutator-bars (marked from $1^a$ to $13^a$, inclusive) form one complete layer on the armature. The wires of the next quadrant, the bars of which are marked $1^b$ to $13^b$, form another complete layer on the armature, which is wound on top of the first layer, and the remaining quadrants have their windings arranged in the same manner. Of course the last wire of one layer is connected to the wire leading from the first commutator-bar of the next section or quadrant, as shown by dotted lines $y$. In this figure I have only illustrated by lines marked $y'$ the connection of each wire as it leaves its commutator-bar.

It will now be seen how materially different this winding is from any heretofore known, and the difference is found in the fact that the wire starting from any one commutator-bar forms a complete system over the whole armature, and is not connected at any intermediate point with any other commutator-bar until its complete circuit of the armature has been accomplished, and it is then connected with the wire leading from the commutator-bar adjoining that one from which the wire started. Of course all the positive brushes are connected and all the negative brushes are connected, and by throwing out one or more brushes or varying its circuit the capacity of the machine may be regulated—that is to say, in Fig. 5, where there are two positive brushes and two negative brushes, I may first throw out a positive brush, which will affect equally all the poles of the armature, and I may then throw out a negative brush, which will also affect all the poles of the armature. If two quadrants be thrown out of action, a portion of the windings covering the entire surface of the armature will be practically thrown out and the magnetic influence of the current equally diminished opposite each pole of the machine.

Obviously the improvements are not restricted to cylinder armatures or to the Gramme winding, but are applicable to multipolar machines of any character. In the case of a dynamo the winding insures equal potential at all brushes of like polarity. As each consecutive brush is lifted, there will be in the armature-circuits controlled by that brush either a reduced current or no current at all.

The following shows the action: Suppose the machine is being driven as a motor with an external electro-motive force of E volts, and that the counter electro-motive force of each armature-circuit between any two brushes is E. Then the difference or available electro-motive force is $E-E=e$. Suppose $r=$ resistance of each armature-circuit between any two brushes, then in a four-pole machine the current in the armature will be as follows:

When one brush is lifted $= \dfrac{e}{\frac{r}{2}} + 0 = 2\dfrac{e}{r}$

When two brushes are lifted $= \dfrac{e}{r} + \dfrac{e}{3r} = \dfrac{4}{3}\dfrac{e}{r}$ In an eight-pole machine:

When one brush is lifted, current $= \dfrac{e}{\frac{r}{6}} + 0 = 6\dfrac{e}{r}$ When two brushes are lifted, current $= \dfrac{e}{\frac{r}{5}} + \dfrac{e}{3r} = \dfrac{16}{3}\dfrac{e}{r}$ When three brushes are lifted, current $= \dfrac{e}{\frac{r}{4}} + 0 = 4\dfrac{e}{r}$ When four brushes are lifted, current $= \dfrac{e}{\frac{r}{3}} + \dfrac{e}{5r} = \dfrac{16}{5}\dfrac{e}{r}$ When five brushes are lifted, current $= \dfrac{e}{\frac{r}{2}} + 0 = 2\dfrac{e}{r}$ When six brushes are lifted, current $= \dfrac{e}{r} + \dfrac{e}{7r} = \dfrac{8}{7}\dfrac{e}{r}$

I claim as my invention—

1. In a multipolar dynamo-electric machine, the combination of a commutator whose bars are insulated from each other with an armature in which the winding or circuit between two commutator-bars traverses or influences each pole thereof, is connected at each of its terminals with but a single point or bar in the commutator, and is unconnected at any intermediate point with any other commutator-bar.

2. In a dynamo-electric machine, the combination of a commutator whose bars are insulated from each other with an armature in which the winding between any pair of adjoining commutator-bars traverses or influences equally each pole, is connected at each of its terminals with but a single point or bar in the commutator, and is unconnected directly with any other commutator-bar, in combination with three or more brushes, substantially as and for the purpose set forth.

3. In a dynamo-electric machine, the combination of the commutator whose bars are insulated from each other with an armature in which the winding extending from one commutator-bar to an adjoining commutator-bar constitutes a circuit that extends around the entire armature, traversing or influencing each pole thereof, is connected at each of its terminals with but a single point or bar in the commutator, and is unconnected at any intermediate point with any other commutator-bar, substantially as set forth.

4. An armature for dynamo-electric machines, in which the commutator-bars are insulated from each other and are apportioned or divided into groups, the windings of each group constitute one layer upon the armature, the winding between adjoining bars of any group traverses or influences equally each pole and is unconnected intermediately with any other bar, and the end of the windings of each group is connected to the first bar of the next group, in combination with brushes, substantially as and for the purpose set forth.

5. A multipolar armature for dynamo-electric machines, in which each winding traverses and influences each pole of the armature, is connected at its beginning with but a single commutator-bar and at its end with but a single commutator-bar adjoining that from which it started, and is unconnected between its terminals with any bar, each winding ending on the commutator-bar from which the next winding starts, substantially as set forth.

In testimony whereof I have hereunto subscribed my name.

STANLEY C. C. CURRIE.

Witnesses:
 JOHN RODGERS,
 A. B. STOUGHTON.